Sept. 25, 1945.   A. LYSHOLM   2,385,366
POWER PLANT FOR AIRCRAFT
Filed April 18, 1939    2 Sheets-Sheet 1
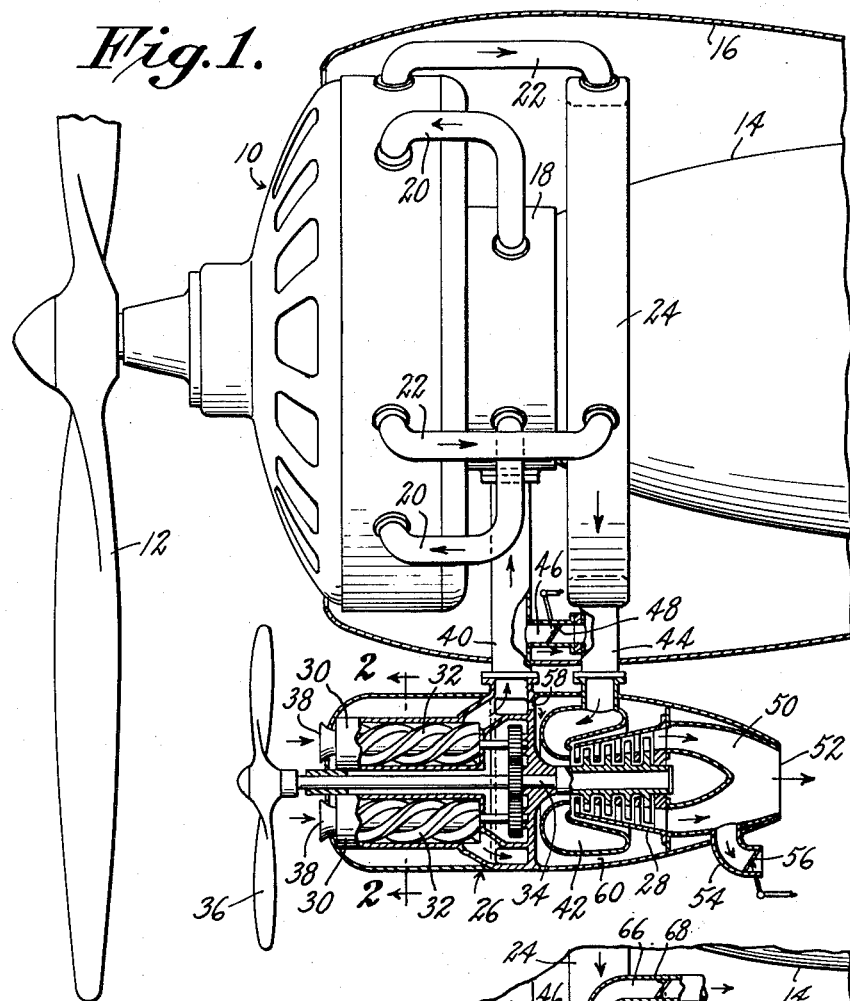
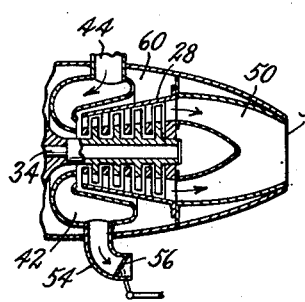
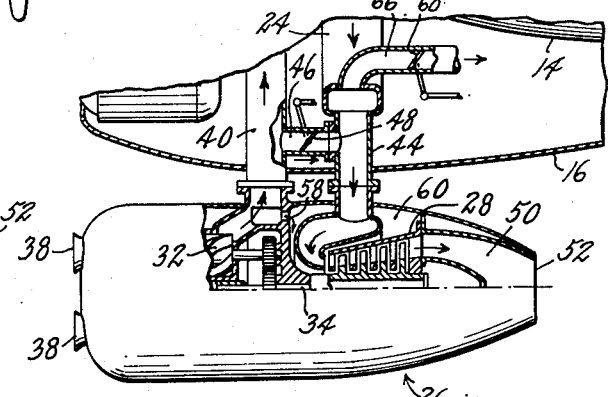
INVENTOR.
Alf Lysholm
BY
his ATTORNEY.

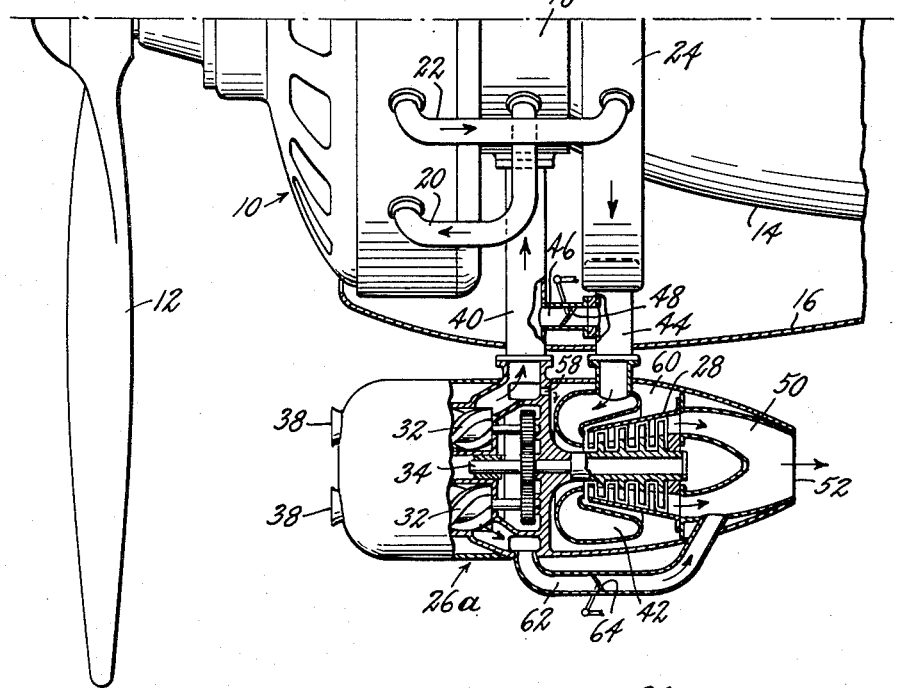
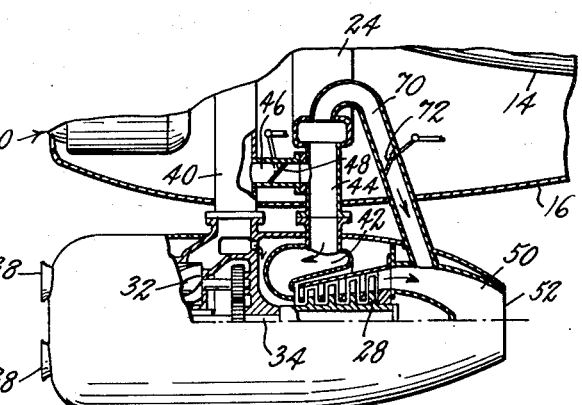
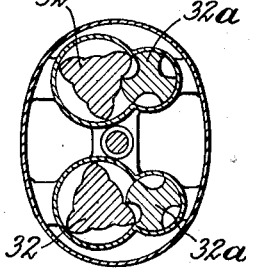

Patented Sept. 25, 1945

2,385,366

UNITED STATES PATENT OFFICE 2,385,366

POWER PLANT FOR AIRCRAFT

Alf Lysholm, Stockholm, Sweden, assignor, by mesne assignments, to Jarvis C. Marble, Leslie M. Merrill, and Percy H. Batten, as trustees Application April 18, 1939, Serial No. 268,540
In Great Britain April 19, 1938

7 Claims. (Cl. 170—135.5)

The present invention relates to power plants for aircraft and has particular reference to power plants in which a part at least of the propelling force for the aircraft is produced by one or more internal combustion engine driven propellers.

In power plants of this general character, it has been proposed to supercharge the internal combustion engine by means of a supercharger driven by a gas turbine operated with exhaust gases from the engine. In arrangements of this sort, it is desirable to be able to change the speed ratio between the internal combustion engine and the turbine driving the supercharger and it has heretofore been proposed that the turbine be provided with an auxiliary propeller having adjustable pitch blades for that purpose.

It is the general object of the present invention to improve upon prior power plants of the character under consideration and to provide for more effective and simple auxiliary propulsion and safer and more reliable control means for varying the output of the supercharger. To this end, in accordance with the invention, at least a part of the energy of the gases supplied to the turbine and not utilized to drive the supercharger is employed to produce a rocket effect for propelling the aircraft.

By use of power plant arrangements embodying the principles of the invention, numerous advantages, hereinafter to be pointed out in more detail, are achieved and for a better understanding of the nature of the invention and the advantages to be derived from its use, reference may best be had to the ensuing portion of this specification in which several different arrangements for carrying the invention into effect are described in connection with the accompanying drawings forming a part hereof.

In the drawings:

Fig. 1 is a more or less diagrammatic side elevation, partly in section, of a power plant embodying the principles of the invention;

Fig. 1a is a fragmentary view showing a modification of the arrangement shown in Fig. 1;

Fig. 2 is a section on line 2—2 of Fig. 1;

Fig. 3 is a view, similar to Fig. 1, showing another arrangement;

Fig. 4 is a fragmentary view similar to Fig. 1 showing still another arrangement; and Fig. 5 is a view similar to Fig. 3 showing still another arrangement.

Referring now to Fig. 1 of the drawings, the internal combustion engine, suitably housed, is indicated generally at 10 and the propeller driven thereby is indicated at 12. As shown, the engine is indicated as mounted at the forward end of a fuselage or nacelle 14, the usual cowling being indicated at 16.

The inlet manifold of the engine is indicated at 18, from which a suitable series of branch inlet pipes 20 lead to the engine cylinders. The exhaust gases from the several cylinders are conducted by means of branch exhaust pipes 22 to an exhaust manifold 24.

A supercharging unit indicated generally at 26 comprises a gas turbine 28 and a pair of compressors 30 of the rotary screw type, the rotors 32 and 32a of which are driven by suitable gearing from the turbine shaft 34. Shaft 34 in the embodiment illustrated extends forwardly of the compressors and carries a propeller 36.

Air for supercharging the engine is admitted to the compressors through the inlets 38 and is delivered under pressure therefrom to the supply pipe 40 connected to the inlet manifold 18.

The inlet chamber 42 for admission of motive fluid to the turbine is connected by means of the exhaust pipe 44 with the exhaust manifold 24 and a by-pass connection 46 is provided for by-passing a predetermined quantity of compressed air from the supply pipe to the exhaust under the control of the by-pass valve 48.

As shown, the turbine 28 exhausts to a rearwardly directed outlet or exhaust passage 50 which is of diminishing cross-sectional area toward the outlet opening 52 and which may be said to constitute an exhaust nozzle. The configuration of the exhaust nozzle is such as to accelerate the rate of flow of the exhaust gases leaving the turbine to enhance the rocket propulsion effect thereof as they are exhausted to the atmosphere. The exhaust nozzle is provided with an auxiliary outlet 54, the flow through which is controlled by means of valve 56.

In the unit just described, the turbine illustrated is of the multiple stage axial flow type and two screw compressors arranged in parallel with respect to air flow are employed. Screw type compressors of the positive displacement type are preferably employed because of their favorable operating characteristics under variable load conditions and may advantageously be of the type disclosed in United States Patent No. 2,243,874, granted to me June 3, 1941.

In order to secure the full benefits of the invention not only should the compressor be of a type giving high efficiency operating characteristics such as the type just mentioned, but the turbine should also be of a high efficiency type such as the multiple stage type herein disclosed.

If other than a high efficiency turbine is employed substantially all of the available energy of the engine exhaust gases is utilized in producing sufficient power to operate the compressor and consequently little if any energy over and above that required to drive the compressor is available for additional propulsion by rocket effect or otherwise. The invention is however not limited to the specific designs of compressor and turbine herein disclosed by way of example.

The operation of the apparatus just described is as follows:

Exhaust gases from the engine 10 are delivered to the turbine 28 and drive the latter to operate the compressors 30, which deliver air under pressure for supercharged operation of the engine 10. A certain amount of the compressed air delivered by the supercharger is by-passed under the control of the valve 48, which is controllable by the operator of the plant, to reduce the temperature of the exhaust gases to a value suitable for admission to the turbine. In the arrangement shown, excess power developed by the turbine, over and above that required to drive the compressor, is utilized to drive the auxiliary propeller 36.

After leaving the turbine 28, the gases are discharged rearwardly of the aircraft through the exhaust nozzle 50 and due to their velocity of discharge, produce a rocket propulsion effect.

The extent of this rocket propulsion effect and also the power output from the turbine for supercharging may be varied by controlling the auxiliary exhaust gas outlet 54. It will be evident that if the auxiliary outlet is opened by manipulation of valve 56, the velocity of exit of the gases will be reduced, thus reducing the rocket propulsion effect. This also will operate to reduce the back pressure against which the gases must be exhausted by the turbine and will consequently operate to increase the pressure drop through the turbine and the mechanical output therefrom for driving the supercharger.

In this manner the amount of air compressed by the supercharger can be controlled very simply and accurately to adjust the plant for most advantageous operation at different altitudes.

If desired, the auxiliary outlet 54 may be placed in communication with the inlet chamber 42 of the turbine, as shown in Fig. 1a. With this arrangement, opening of valve 56 will operate to by-pass a controlled part of the motive fluid directly to atmosphere. This by-passing of motive fluid directly to atmosphere will reduce the quantity of high velocity exhaust gases discharged from the turbine, thereby reducing the rocket propulsion effect, and will also operate to reduce the power output of the turbine and consequently the amount of air delivered by the supercharger.

In order to cool the shaft bearing and packing at the inlet end of the turbine, a small by-pass connection 58 may advantageously be provided between the compressor and the space 60 around the inlet chamber, from which space the cooling air can flow to the inlet of the blade system of the turbine, mingling therein with the motive fluid delivered from chamber 42.

In the embodiment illustrated in Fig. 3, the supercharging unit 26a is adapted to utilize all of the mechanical power developed by the turbine for driving the supercharger. In this arrangement the general organization is the same as previously described in connection with Fig. 1, the compressed air being delivered to pipe 40 and the exhaust gases from the engine being delivered through pipe 44 to the inlet chamber 42 of the turbine. As in the previously described embodiment, control of the temperature of the gases as admitted to the turbine is effected through the medium of the by-pass connection 46 and control valve 48.

The present embodiment differs from the previously described arrangement in that a by-pass connection 62 is provided for by-passing a controlled portion of the compressed air directly from the compressor 30 to the exhaust nozzle 50. Regulation of the amount so by-passed is effected by operation of the control valve 64.

In this arrangement, if it is desired to reduce the amount of air compressed for supercharging the engine, the control valve 64 is opened and a portion of the compressed air is delivered to the exhaust nozzle, to be mixed therein with the exhaust gases from the turbine and discharged to atmosphere. By-passing of the compressed air operates to increase the quantity of gas delivered through the exhaust nozzle and this in turn operates to increase the back pressure on the turbine, thus reducing the amount of power available for driving the compressor. With this arrangement the rocket effect is increased as the work devoted to supercharging is decreased. As in the previously described embodiment, a small quantity of compressed air is by-passed from the compressor through one or more openings 58 to the space 60 for the purpose of cooling the bearing and packing at the inlet end of the turbine.

In the arrangement illustrated in Fig. 4, the supercharging unit is of the same type as is illustrated in Fig. 3, in which all mechanical power developed by the turbine is used for operating the supercharger. This arrangement is like the preceding arrangements with respect to the delivery of compressed air through the conduit 40 and the delivery of motive fluid through the exhaust pipe 44 and is provided with the by-pass 46 and control valve 48. In this instance, however, control of the output of the turbine to the compressor is effected by means of an auxiliary outlet 66 for discharging a controlled portion of the exhaust gases from the engine directly to atmosphere under the control of the regulating valve 68.

With this arrangement the output of the turbine and also the quantity of air compressed will be reduced more or less depending upon the extent to which the valve 68 is opened.

The arrangement shown in Fig. 5 is similar in all respects to that shown in Fig. 4 except that in the present instance a by-pass conduit 70 is provided for by-passing a controlled portion of the exhaust gases of the engine from the exhaust line thereof to the exhaust nozzle 50 of the turbine. The quantity of exhaust gas by-passed is regulated by means of the control valve 72.

In this arrangement the operation is substantially the same as that for the arrangement shown in Fig. 4 except that in this case the by-passing of a portion of exhaust gas from the engine to the exhaust nozzle operates to reduce the power developed by the turbine not only by reducing the quantity of motive fluid supplied to the turbine, but also by increasing the back pressure against which the turbine must exhaust. Further, in the present arrangement, the rocket effect is enhanced when the power developed by the turbine is reduced, since none of the exhaust gases is by-passed directly to atmosphere. It is to be noted that with the arrangements embodying the principles of the present invention, the efficiency of propulsion, especially at high velocity of flight and under conditions in which there is a small heat drop in the turbine, may be increased since the energy in the exhaust gases not utilized for developing power in the turbine may be effectively utilized to aid in propulsion through the rocket effect of the gases.

It will also be evident that any desired change in the ratio of speed of operation of the main engine and of its supercharging compressor, and other controlling operations for varying the amount of supercharging air supplied to the engine, may readily be effected by simple control valves easily and reliably operable by the operator of the plant.

The arrangement in which the turbine drives the supercharging compressor and auxiliary propeller as well, and in addition thereto produces rocket propulsion effect, is particularly adapted for aircraft intended to be operated at relatively low flying speeds.

It will be apparent that many modifications of apparatus may be employed within the scope of the invention.

For example, if a plurality of compressors is employed, the output of one may be used entirely for supercharging the engine while that of another may be employed for supplying cooling air to the engine exhaust gases before their entry into the turbine. It will also be evident that where multiple compressors are employed, one or more of them may be driven from the main engine.

It is accordingly to be understood that the invention embraces all forms and arrangements of the apparatus falling within the scope of the appended claims.

What is claimed is:

1. A power plant for aircraft propulsion including an internal combustion engine, a propeller driven by said engine, an exhaust gas turbine independent of said engine with respect to speed of operation, an exhaust conduit for conducting exhaust gases from the engine to the turbine, an air compressor driven by the turbine, an exhaust nozzle associated with the turbine for exhausting gases therefrom at high velocity to produce a rocket propulsion effect, said nozzle being closed against admission thereto of material quantities of air at atmospheric pressure, and means for controlling the mechanical power output of said turbine comprising an auxiliary exhaust gas conduit leading from said turbine and a valve for controlling flow through said auxiliary conduit.

2. A power plant for aircraft propulsion including an internal combustion engine, a propeller driven by said engine, a multiple stage exhaust gas turbine independent of said engine with respect to speed of operation, a conduit for conducting exhaust gases from the engine to the turbine, an air compressor driven by the turbine for supplying supercharging air to the engine, an exhaust nozzle associated with the turbine and having a rearwardly directed outlet, said nozzle being closed against admission of fluid at atmospheric pressure and having walls contracting in the direction of exhaust gas flow therethrough to accelerate the velocity of the exhaust gases and deliver them through the nozzle outlet to the atmosphere at a velocity materially higher than the exit velocity from the turbine, whereby to convert the residual pressure energy of the exhaust gases into velocity energy and utilize the latter to produce a rocket propulsion effect, and bypass valve means operative to modify the gas flow through the turbine so as to vary the pressure drop therethrough for controlling the mechanical power output of the turbine available for driving the compressor.

3. Apparatus as set forth in claim 2 in which said bypass valve means is arranged to divert a portion of the fluid under pressure available for use as motive fluid for the turbine, whereby to reduce the pressure drop through the turbine by decreasing the quantity of motive fluid supplied thereto.

4. Apparatus as set forth in claim 2 in which said bypass valve means is arranged to divert a portion of the engine exhaust gas, whereby to reduce the pressure drop through the turbine by reducing the quantity of motive fluid supplied thereto.

5. Apparatus as set forth in claim 2 in which said bypass valve means is arranged to divert a portion of the engine exhaust gas from said conduit directly to atmosphere, whereby to reduce the pressure drop through the turbine by decreasing the quantity of motive fluid supplied thereto.

6. A power plant for aircraft propulsion including an internal combustion engine, a propeller driven by said engine, a multiple stage exhaust gas turbine independent of said engine with respect to speed of operation, a conduit for conducting exhaust gases from the engine to the turbine, an air compressor driven by the turbine for supplying supercharging air to the engine, an exhaust nozzle associated with the turbine and having a rearwardly directed outlet, said nozzle being closed against admission of fluid at atmospheric pressure and having walls contracting in the direction of exhaust gas flow therethrough to accelerate the velocity of the exhaust gases and deliver them through the nozzle outlet to the atmosphere at a velocity materially higher than the exit velocity from the turbine, whereby to convert the residual pressure energy of the exhaust gases into velocity energy and utilize the latter to produce a rocket propulsion effect, and bypass valve means operative to modify the gas flow through the turbine so as to vary the pressure drop therethrough for controlling the mechanical power output of the turbine available for driving the compressor, said bypass valve means being arranged to divert a portion of the air supplied by said compressor, whereby to reduce the quantity of exhaust gas delivered by the engine and thereby reduce the pressure drop through the turbine by decreasing the quantity of motive fluid supplied thereto.

7. A power plant for aircraft propulsion including an internal combustion engine, a propeller driven by said engine, a multiple stage exhaust gas turbine independent of said engine with respect to speed of operation, a conduit for conducting exhaust gases from the engine to the turbine, an air compressor driven by the turbine for supplying supercharging air to the engine, an exhaust nozzle associated with the turbine and having a rearwardly directed outlet, said nozzle being closed against admission of fluid at atmospheric pressure and having walls contracting in the direction of exhaust gas flow therethrough to accelerate the velocity of the exhaust gases and deliver them through the nozzle outlet to the atmosphere at a velocity materially higher than the exit velocity from the turbine, whereby to convert the residual pressure energy of the exhaust gases into velocity energy and utilize the latter to produce a rocket propulsion effect, and bypass valve means operative to modify the gas flow through the turbine so as to vary the pressure drop therethrough for controlling the mechanical power output of the turbine available for driving the compressor, said bypass valve means being arranged to divert a portion of the air delivered by the compressor to said exhaust nozzle, whereby to reduce the quantity of exhaust gas produced by the engine and to reduce the pressure drop through the turbine by decreasing the quantity of motive fluid delivered thereto and by increasing the backpressure on the turbine due to the air diverted to the exhaust nozzle.

ALF LYSHOLM.